United States Patent [19]

Jackson

[11] Patent Number: 4,635,847

[45] Date of Patent: Jan. 13, 1987

[54] FIELD MARKER AND METHOD

[76] Inventor: Michael R. Jackson, HC02, Box 11-C, Weippe, Id. 83553

[21] Appl. No.: 666,174

[22] Filed: Oct. 29, 1984

[51] Int. Cl.⁴ ............................................. B05B 1/20
[52] U.S. Cl. ..................................... 239/1; 111/26;
 111/33; 116/209; 172/126; 239/172
[58] Field of Search .............. 239/150, 172, 1; 47/56;
 111/25–26, 33; 172/126, 430; 116/209;
 156/510, 523; 404/94

[56] References Cited

U.S. PATENT DOCUMENTS

| | | |
|---|---|---|
| 2,199,421 | 5/1940 | Stevens, Jr. . |
| 3,019,470 | 2/1962 | Romeo . |
| 3,072,200 | 1/1963 | Yerkes . |
| 3,198,383 | 8/1965 | Brown . |
| 3,443,727 | 5/1969 | Wellford, Jr. . |
| 3,470,846 | 10/1969 | Tillay et al. . |
| 3,481,545 | 12/1969 | Cooke . |
| 3,524,508 | 8/1970 | West . |
| 3,531,024 | 9/1970 | Rosselot . |
| 3,766,987 | 10/1973 | Orthman . |
| 3,903,970 | 9/1975 | Grataloup . |
| 3,945,330 | 3/1976 | Leavitt et al. ................ 47/56 X |
| 4,011,914 | 3/1977 | Elmer .......................... 172/126 |
| 4,092,936 | 6/1978 | Griffin et al. ................. 47/56 X |
| 4,192,462 | 3/1980 | Erickson ...................... 239/288 |
| 4,270,482 | 6/1981 | Forsyth ........................ 116/209 |
| 4,316,554 | 2/1982 | Lloyd . |
| 4,317,696 | 3/1982 | Hutchinson et al. ....... 404/94 X |

FOREIGN PATENT DOCUMENTS 673256 7/1979 U.S.S.R. ............................. 239/172

Primary Examiner—Andres Kashnikow
Attorney, Agent, or Firm—Wells, St. John & Roberts

[57] ABSTRACT

A field marker is disclosed for selectively dropping sections of rolled paper tissue to the ground surface to indicate the boundary of an area being treated with a liquid. The marker includes a device for mounting a tissue roll for rotation to facilitate unraveling the free end of the paper tissue. A gripping mechanism is provided to take hold of the free tissue end and pull it from the roll. The action is such that individual tissue sections are selectively removed from the tissue roll and dropped to the ground surface. Preferably, the area marked is slightly inward of the treatment pattern such that the dropped tissue sections are saturated by the liquid being applied and thereby secured to the ground surface.

19 Claims, 5 Drawing Figures

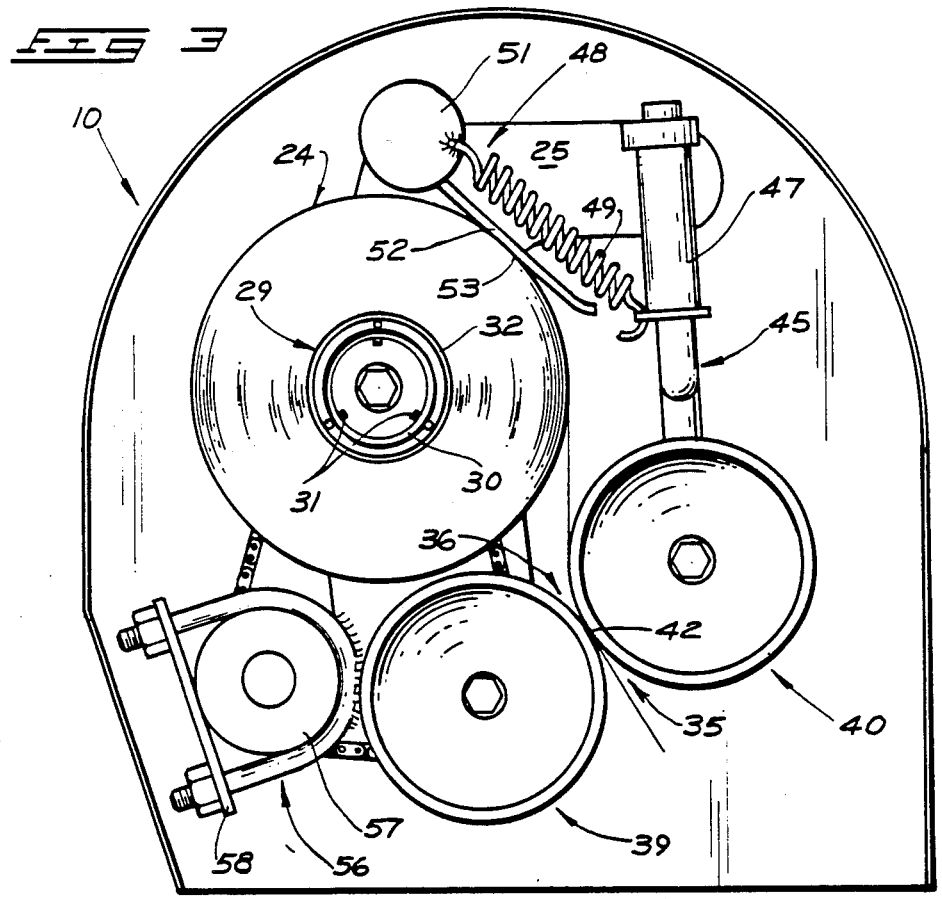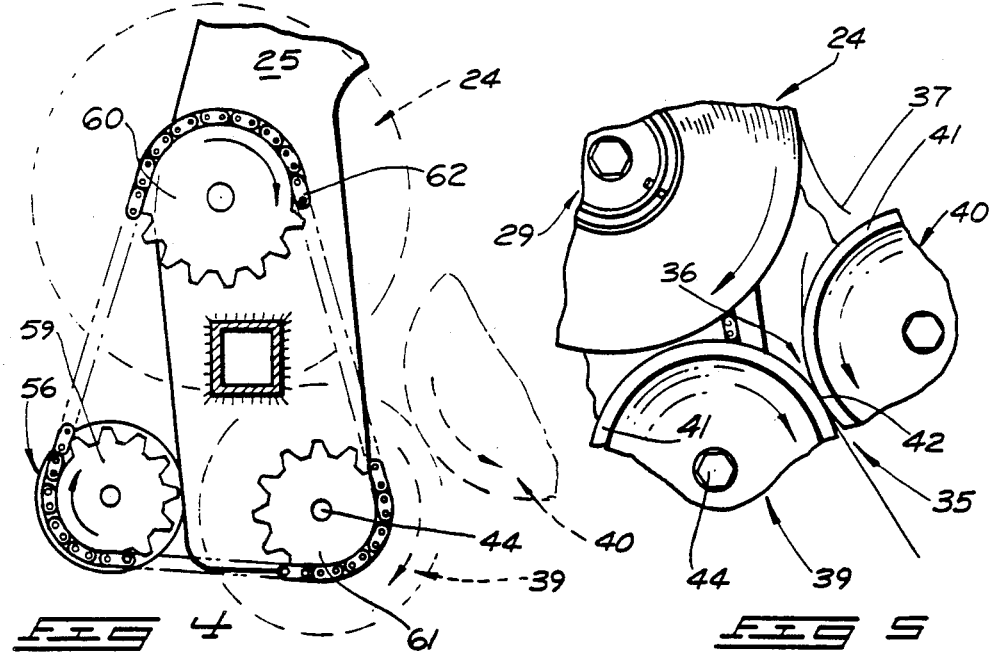

FIELD MARKER AND METHOD

FIELD OF THE INVENTION

The present invention relates to placement of visible markers along an edge of a ground surface area being treated by application of a liquid.

BACKGROUND OF THE INVENTION

Liquid used for soil treatment in applications of fertilizers, herbicides, pesticides and other soil treatments is often applied to the ground surface by spraying from an elongated boom moved over the field surface behind a tractor. The liquid is fed to the boom from a container either carried on the spraying device or otherwise attached to the tractor. The boom is typically mounted in a transverse orientation to the direction of movement to the tractor in order to produce a wide application pattern. The overall length of the boom enables application of the liquid in a minimum number of passes or swaths across the field. The difficulty, however, is in knowing exactly where the boundary of the previous liquid application swath lies since it is desirable to avoid overlapping applied liquid, or leaving areas or gaps of ground surface untreated.

Various forms of foam marking devices have been developed as suggested solutions to the above problem. Such devices usually include a relatively complex mechanism for mixing components to produce a foam marker that is discharged at one end of a spray boom to mark the boundary of the spray pattern. These apparatus are functional but are quite complex and, consequently, expensive. Furthermore, the foam components are not readily available.

One example of a foam marking device for liquid applicators is disclosed in U.S. Pat. No. 3,481,545 to Cooke et al. Cooke et al discloses a pressurized foam producing apparatus for selectively discharging patches of foam at opposed ends of a spray discharge boom. The foam material itself is not specifically disclosed but merely is indicated as being an "agriculturally unobjectionable foamable liquid". The apparatus requires a container for receiving the foamable liquid and for being pressurized by an air compressor or by other mechanism to produce the foam and to discharge it by delivery tubes to the liquid applicator boom ends.

U.S. Pat. No. 3,531,024 to Rosselot discloses an electrically operated field marking device by which a spray marker is applied to the boundary of a liquid spray pattern. The marking substance is indicated as being a powder such as dehydrated lime.

Other apparatus have been used for physically marking the ground surface by means of a cutting disk. U.S. Pat. Nos. 3,903,970; 3,072,200; 3,766,987; and 3,524,508 disclose such apparatus. Use of this form of apparatus is not feasible in previously planted fields since the marking device will destroy a portion of the crop.

Disposable paper streamers have been utilized in aircraft for marking the boundaries of a treatment area of the ground surface in which the treatment has been applied by aircraft. One example of such is found in U.S. Pat. No. 3,470,846. This patent shows a magazine carrying a plurality of independent streamers for individual discharge through an end of the magazine. The device makes use of air pressure directed into the magazine to feed the individual markers toward the rear opening. A plunger is utilized to separate the rearmost streamer from the remainder of the stack for discharge to the ground surface.

U.S. Pat. No. 4,316,554 discloses another form of aerial marker launcher using individual elongated strips.

The problem of marking treated areas of the ground surface is also recognized in smaller applications. For example, U.S. Pat. No. 3,443,727 to Wellford discloses a lawn marker for use in conjunction with a dry granular or powdered material dispenser. This device makes use of an auxiliary wheel mounted to the frame of the spreader. The wheel is filled with a marking material that is discharged in small amounts on each rotation of the auxiliary wheel. The small amount of discharged material therefore produces a spot or dot positioned along the boundary of the area being treated.

Another example of a somewhat similar device is disclosed in U.S. Pat. No. 3,019,470. Here, however, the marking material is applied directly to the ground surface from nozzles situated ahead of the cart wheels. An integral hopper for marking the boundary of applied material in a similar lawn spreader is shown in U.S. Pat. No. 3,198,383. This hopper is formed integrally with the material hopper of the spreader and delivers its marking material through the available spreading mechanism.

U.S. Pat. No. 2,199,421 discloses a liquid marking device mountable to seed planters. A liquid marking medium is delivered by hoses to opposed ends of the seed planter unit and is discharged to the ground surface for marking the seeding swath at its outward borders.

Of the above references, none provide a simple yet adequate solution to the problem of marking the boundaries of treated ground surface. Devices applying liquid markers often employ dyes, paint, or other materials that are not easily distinguishable from a distance. Often such materials are harmful to the soil and not readily available to the user.

Foam markers are perhaps more visible, yet the foaming agents are not readily available and the foam producing equipment is complex and expensive.

Powder markers have the drawback of potential permanence. For example, a lime deposit used as a marker will remain on the ground surface until plowed under. This could cause confusion if subsequent applications of liquid need be applied. The previous markers could be confused with present markers.

Tissue markers offer a viable alternative but until the present invention, have not been available for ground operated implements or with the marking medium in a readily available form. Former tissue streamers are specially constructed with tissue strips attached to cardboard dividers and nested in a stack for dispensation from an airplane. This special construction is required by the dispensing apparatus for proper operation. The tissue strips, due to their unique construction, are not readily available on the market.

Even so, tissue markers are desirable since the paper components readily disintegrate into the soil after a short period with no ill effects to the surrounding vegetation. Thus, while the advantages of tissue used as field markers has been recognized, the problem of adequately applying readily available tissue markers from ground supported liquid applying apparatus has not been recognized or adequately solved until the advent of the present invention.

The present invention is provided as a solution to the above problems by facilitating application of a readily available paper tissue to the ground surface as a field marker from a ground supported implement. The marking apparatus is specially adapted to remove sections from readily available roll of tissue paper, thus providing a simple and effective solution to the problem of quick and inexpensive access to an adequate marking medium.

BRIEF DESCRIPTION OF THE DRAWINGS

A preferred form of the present invention is illustrated in the accompanying drawings in which:

FIG. 3 is an end elevation view of the present marker;

FIG. 4 is a fragmented view illustrating a drive mechanism for the present marker components; and FIG. 5 is an operational view illustrating separation of a section of marking tissue from a roll of such tissue carried on the present marker.

DETAILED DESCRIPTION OF THE PREFERRED EMBODIMENT

Figure 1:
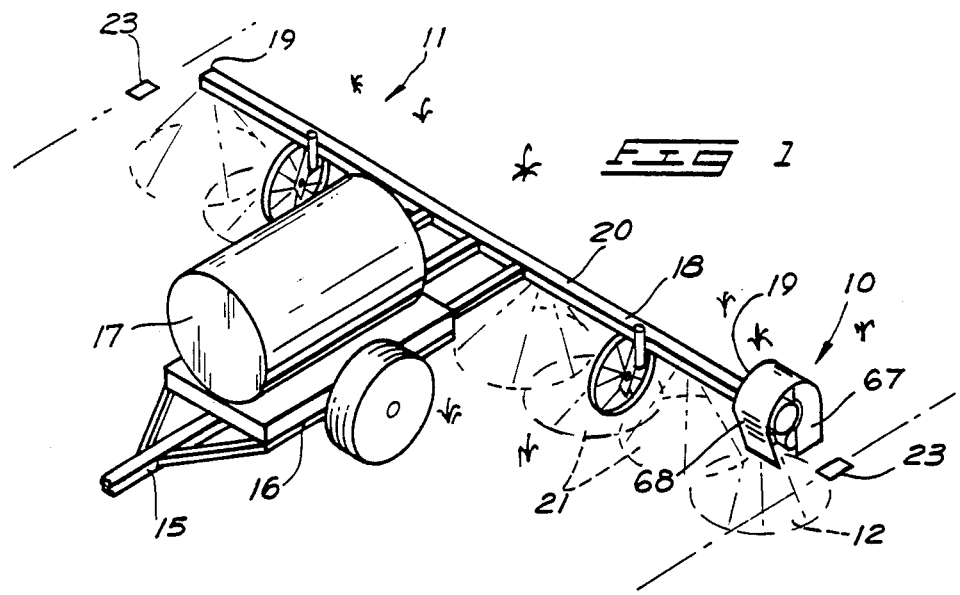
FIG. 1 is a diagrammatic view of a liquid applicator implement with a field marker in operation thereon.

In compliance with the constitutional purpose of the Patent Laws "to promote the progress of science and useful arts" (Article 1, Section 8), applicant submits the following disclosure of the invention.

The principal components of the present invention are embodied in a field marker generally designated in the drawings by the reference numeral 10. The field marker 10 is provided as an attachment or as an integral part of a liquid applicator implement 11 (FIG. 1) such as those used for applying liquid fertilizer, pesticides, herbicides, or other soil treatment to the ground surface, especially on farm land.

The liquid applicator 11 diagrammatically shown in FIG. 1 is used to apply a liquid spray 12 to the ground surface in a prescribed pattern while being moved behind a towing vehicle such as a conventional tractor (not shown). The implement 11 may include a towing tongue 15 for attachment to a towing vehicle. The tongue extends from a wheeled frame 16 that may be provided for supporting a liquid storage tank 17.

Liquid from the storage tank is delivered to a transverse boom 18 extending across the towing path to opposed boom ends 19. Spray or dispensing heads 20 may be located along the length of the boom between its ends to discharge liquid in a prescribed pattern which is indicated somewhat by dashed lines 21 in FIG. 1.

The towing implement can move the liquid applicator 11 over the ground surface, producing an elongated treated surface area or swath. The outward dispensing heads 20 spray the liquid along opposed longitudinal boundaries of the swath. At least one such boundary is capable of being marked for identification by use of the present field marker 10.

The present field marker 10 is provided for marking the spray pattern 21 by using paper tissue sections 23 dropped to the ground adjacent one edge of the elongated spray pattern boundary. The tissue sections are preferably taken from a roll 24 of thin perforated paper tissue such as bathroom tissue available commercially in many assorted varieties and at little expense. Additionally, bathroom tissue is preferably used since it will readily degrade on the ground surface and disappear without harming vegetation.

The present field marker 10 includes a rigid marker frame 25 attached to the liquid applicator boom 18 by a bracket means 26. Means 26 may be utilized to secure the market adjacent one boom end 19. There the tissue sections can be dropped directly to the ground surface just slightly within the boundary of the liquid application area.

A roll mounting means is provided at 29 on the marker frame 25. Roll mounting means 29 is provided to receive and mount a tissue roll 24 for rotation about a roll axis. This axis is defined by a tube 30 for slidably receiving the core tube 32 of the tissue roll. Spring wires 31 may be provided along the length of the tube 30 to yieldably engage the roll core tube 32 to secure the tissue roll against rotation relative to the tube 30. The tissue roll will rotate only in response to like rotation of the roll mounting means tube 30.

A tissue roll can be mounted to the tube 30 simply by sliding the tissue roll core 32 axially over the spring wires 31. Once the length of tissue supply has been depleted, the core tube 32 can be removed simply by sliding it axially free of the spring wires. Another tissue roll can then be mounted to the tube 30 for subsequent operations.

Figure 2:
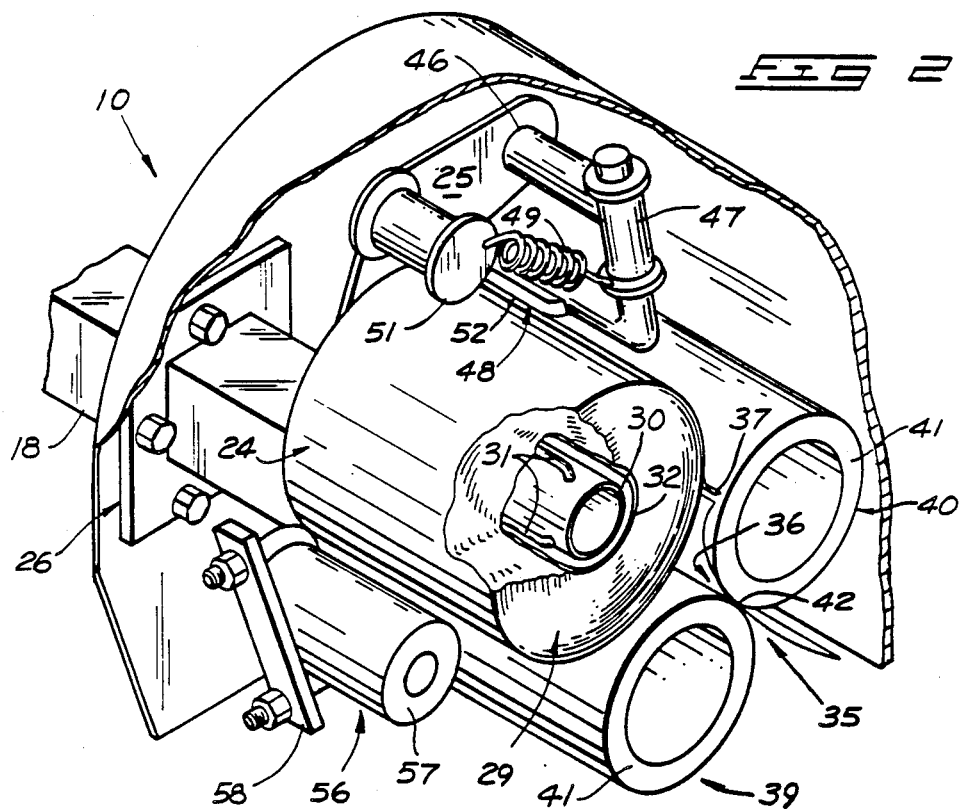
FIG. 2 is a fragmented pictorial view of the present marker.

A paper section separating means is generally shown at 35 in the drawings for selectively removing sections of tissue paper from the roll and for dropping the removed sections to the ground surface. The paper section separating means 35 is shown in substantial detail by FIGS. 2, 3, and 5. It basically includes movable gripping surfaces 36 that converge toward one another adjacent one side of the roll mounting means to engage and pull a free tissue end 37 (FIGS. 2 and 5) from the tissue roll.

Preferably, the movable gripping surfaces are comprised of first and second rollers 39 and 40 respectively. The rollers 39 and 40 include tangentially engaged peripheral tissue gripping surfaces 41. These surfaces may be covered with a high friction material such as rubber.

The rollers 39 and 40 touch one another tangentially at a point of engagement designated in the drawings at 42. This tangential point of engagement and the areas of the roller tissue gripping surfaces exposed above point 42 exemplify the movable gripping surfaces 36. The point of tangential contact 42 is preferably along a line that extends parallel to the rotational axis of the tissue roll and mounting means 29. Point 42 is preferably situated to one side of the roll axis to facilitate reception of the free tissue roll end 37.

The first roller 39 is mounted by an axle 44 to the frame 25. The axle facilitates rotational movement of the first roller about an axis parallel to the rotational axis of the roll mounting tube 30.

The second roller 40 is supported by a hanger 45 for rotational motion about an axis thereon parallel to the axis of axle 44. The hanger is suspended from the frame 25 at a pivot 46. The roller 40 will therefore swing in an arc about a horizontal pivot axis toward or away from the point of engagement 42 between the two rollers. A sleeve 47 facilitates further pivotal motion about an upright axis passing through the horizontal pivot axis.

A biasing means 48 is provided to urge the second roller 40 against the first roller 39 at the engagement point 42. The biasing means 48 is simply comprised of a tension spring 49 extending between the sleeve 47 and a pivot collar 51 on the frame. The spring is placed under tension to continuously urge the second roller against the first roller.

The second roller can be forcibly pivoted away from the first roller to facilitate loading of a tissue roll and positioning of the free end thereof between the two rollers. The "loaded" condition is shown in FIG. 3.

Once the tissue roll has been mounted and the free tissue end pulled between the separated rollers, the second roller can be released to be pulled by spring 49 into engagement with the first roller 39. The tissue is thereby effectively gripped between the converging friction surfaces of the roll. Relatively free pivotal motion of the second roll about the axis defined by sleeve 47 insures consistent longitudinal engagement of the converging roller surfaces. In other words, the second roller will pivot about the axis of the sleeve when pulled against the first roll until its full length is tangentially engaged against the peripheral surface of the first roll. This assures even, full contact between the rollers and tissue.

A retainer arm 52 may be provided along the pivot collar 51. The retainer arm 52 is spring biased to engage a tissue roll held on the mounting means 29. The arm includes a relatively flat roll engaging surface 53 and extends to an end upwardly adjacent the first and second rollers 39. The arm prevents the roll from unraveling and confines the free roll end within an area adjacent the converging gripping surfaces 36.

A drive means 56 is provided for selective operation to rotate one of the rollers 39 or 40. Preferably, the drive means is operably connected to the first roller to rotate it in the direction indicated in FIG. 5. The drive means may include an electric gear motor 57 mounted by a bracket 58 to the frame 25. A sprocket 59 is mounted to the motor drive. Another sprocket 60 is mounted to the tube 30 of the roll mounting means. A third sprocket 61 is mounted to the axle of the first roller 39.

All three sprockets 59, 60, 61, are interconnected by a roller chain 62 (FIG. 4). Rotation of the sprocket 59 initiated by motor 57 will be transmitted through chain 62 to the remaining sprockets 60 and 61. FIGS. 4 and 5 illustrate the rotational direction of the sprockets and the resulting rotation of the tissue roll and rollers. It is noted that the tissue roll, with reference to FIG. 4, rotates in a clockwise direction. The rollers are situated on the downward rotational side of the roll and are driven to rotate in opposed directions. The free end of the tissue is thus initially unraveled from the tissue roll as the roll rotates in a clockwise direction (as viewed in FIGS. 3 through 5). The rotating roll moves the free tissue end downwardly until it touches one of the rotating gripping surfaces 36. Frictional engagement between the tissue end and the moving surface causes the free tissue end to be drawn toward the point of tangential engagement. The tissue is gripped between the rollers at this point and is pulled as indicated in FIG. 5, away from the rolls.

At this point it is important to indicate the differential speed of the rollers 39, 40 and the roll mounting tube 30. FIG. 4 indicates differential sizes for the sprockets 59 through 61. Sprocket 60 is shown somewhat larger than the sprocket 61 on the first roller. This relationship results in the roller 39 rotating at a somewhat faster rate than the tissue roll on the tube 30. The faster rotating rollers serve to engage and pull the tissue clear of the slower rotating roll. The perforated nature of such tissue is such that the individual tissue sections will be separated by this pulling motion. The separated tissue will then be delivered on through between rollers 39 and 40 and be dropped to the ground surface below.

A shroud 67 is provided partially encircling or encompassing the roll mounting means and section separating means. Bottom and side openings 68 of the shroud are provided to ventilate the particular area within the shroud between the rollers and tissue roll. Ventilation to this area assists separation of the free tissue end from the roll as diagrammatically demonstrated in FIG. 5. Without proper ventilation there is a chance that the free roll end would adhere to the peripheral surface of the tissue roll and be carried on around with rotation of the roll beyond the grasping rollers.

From the above description, the method of operation for the present apparatus should be easily understood. Firstly, prior to operation, the apparatus may be attached to an existing implement. This step, of course, is eliminated where the apparatus is constructed integrally with the implement. In either case, however, the marking device is situated adjacent one end of the boom and slightly inward of the spray pattern edge and forward of the boom. Strips of tissue dropped to the ground surface will fall within the liquid application pattern. This assures that the otherwise very lightweight tissue sections will be saturated with the applied liquid and will adhere well to the treated ground surface. If positioned otherwise, the lightweight tissue sections could have a tendency to be carried out of position by winds.

The method of using the present apparatus may begin by mounting a roll of paper tissue to the tissue roll mounting means. This is accomplished by axially sliding the tissue roll onto the mounting tube 30. Care is taken to position the roll windings so the free end of the roll is in the orientation shown in the drawings, with the free roll end hanging from the roll toward the converging gripping surfaces of the paper section separating means 35. The next step is rotating the perforated roll on the roll mount about its axis to unroll a length of the paper tissue. This step is accomplished along with the step of directing the paper length being unrolled toward the paper separating means 35. The paper separating means then functions to grasp the unrolled paper, separating it from the roll and subsequently dropping the separated paper onto the ground surface adjacent the boundary of the area being treated. Separation is accomplished due to the different rotational speeds of the roll 24 and rollers 39, 40. The faster moving rollers pull succesive sections (along the perforations) from the slower rotating roll.

Operation of the motor 57 can be controlled from the cab of the associated tractor by appropriate control mechanisms (not shown). Therefore, the marker can be selectively used to drop a single section of tissue at any selected interval desired by the vehicle operator.

The differential speed of rotation for the tissue roll 24 and gripping rollers 39, 40, assures that each individual section defined between perforations along the length of the tissue on the roll may be separated and dropped individually to the ground surface. There is, therefore, a potential of producing marks along the ground surface equal in number to the number of individual tissue sections on a roll, before it becomes necessary to attach another roll to the mounting tube 30. When this does become necessary, changing is simply accomplished by removing the blank roll tube core 32 from the roll mounting tube 30 and reattaching a fresh tissue roll. The marker is then ready for further use.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A liquid applicator for applying a liquid over the ground and for marking a swath of applied liquid by applying sections of paper tissue interconnected by perforated tear lines, taken from a tissue roll of sections, to the ground surface along an edge of the swath, said applicator comprising:
an elongated applicator boom extending to opposed ends;
means for applying liquid to the ground surface through the boom;
means for attaching the applicator boom to a vehicle for movement therewith;
a marker frame adjacent one end of the applicator boom;
roll mounting means on the frame for mounting a roll of paper tissue;
paper section separating means on the frame for selective actuation to tear successive sections of paper from a paper tissue roll comprised of a length of interconnected sections on the roll mounting means and for dropping the successive sections of paper to the ground.

2. The liquid applicator of claim 1 wherein the roll mounting means is adapted to releasably receive a roll of tissue paper and hold the roll for rotation about a roll axis.

3. The liquid applicator of claim 2 wherein the paper section separating means includes movable converging paper gripping surfaces adjacent the roll mounting means, adapted to engage and pull paper from a roll held on the roll mounting means.

4. The liquid applicator of claim 3 wherein the converging gripping surfaces are comprised of peripheral cylindrical surfaces of a pair of tangentially engaged rollers mounted to the marker frame and further comprising:
drive means for selective operation to rotate one of the rollers.

5. The liquid applicator of claim 4 wherein the drive means is connected to the roll mounting means for rotating the roll mounting means simultaneously with the one roller.

6. The liquid applicator of claim 5 wherein the drive means is selectively operable to rotate the roll mounting means and the one roller at different speeds, with the roller being rotated faster than the roll mounting means.

7. The liquid applicator of claim 1 wherein the applicator boom discharges liquid over a prescribed pattern along the ground surface and wherein the paper separating means is positioned on the frame to drop sections of paper within the prescribed pattern adjacent an edge thereof such that the paper sections will become saturated with liquid and adhere to the ground surface.

8. The liquid applicator of claim 1 further comprising a shroud covering the roll mounting means and paper section separating means to protect a tissue roll on the mounting means against moisture and open area to facilitate ventilation between the roll mounting means and section separating means.

9. The liquid applicator of claim 1 further comprising retainer arm means on the frame adjacent the roll mounting means for engagement with a tissue roll on the roll mounting means to prevent the tissue roll from unraveling beyond a prescribed area between the roll mounting means and the paper section separating means.

10. The liquid applicator of claim 9 further comprising a shroud covering the roll mounting means and paper section separating means to protect a tissue roll on the mounting means against moisture and having an open area to facilitate ventilation between the roll mounting means and section separating means.

11. The field marking apparatus as defined by claim 1 further comprising:
shroud means on the frame partially enclosing the roll mounting means and separating means for sheltering the roll mounting means and separating means against wind and moisture.

12. A field marking apparatus for selectively tearing sections from a roll of perforated tissue having a loose end and formed of a length of interconnected sections defined by perforated tear lines, for dropping the sections to the ground surface from an agricultural implement to mark an edge of the application pattern produced along the ground surface as the implement is moved along, wherein the field marking apparatus is comprised of:
a frame;
bracket means for attaching the frame to the implement;
roll mounting means adapted to receive and mount a roll of perforated tissue on the frame for rotation about a roll axis;
separating means on the frame for selectively grasping the loose end of the tissue roll and tearing sections of tissue along one of the perforated tear lines, from the interconnected sections making up the roll of perforated tissue on the roll mounting means and for successively dropping the removed sections to the ground surface.

13. The field marking apparatus as claimed by claim 12 wherein the section separating means is comprised of:
a pair of rollers having cylindrical tangentially engaged peripheral surfaces mounted to the frame under the roll mounting means for rotation about axes substantially parallel to the roll axis.

14. The field marking apparatus as claimed by claim 13 wherein the drive means is connected to the roll mounting means for rotating the roll mounting means about the roll axis in a direction to feed tissue from a roll thereon to the tissue receiving trough formed by the pair of rollers.

15. The field marking device as claimed by claim 14 wherein the speed of rotation for the roller driven by the drive means is faster than that of the roll mounting means.

16. The field marking apparatus of claim 14 further comprising gripping means on the roll mounting means for receiving and securing a roll of tissue for rotation with the roll mounting means.

17. The field marking apparatus of claim 12 further comprising retainer arm means on the frame for tangential sliding engagement with a roll of tissue on the roll mounting means to prevent the roll from unraveling and for confining the loose end of the tissue roll in the vicinity of the section separating means.

18. The field marking apparatus as defined by claim 17 wherein the retainer arm means is yieldably biased to press against a roll of tissue held on the roll mounting means.

19. A method of marking the boundary of a ground surface area being treated by a moving implement, comprising the steps of:

mounting a roll of perforated tissue comprised of interconnected perforated tissue sections to a roll mount on the implement;

rotating the roll on the roll mount about a roll axis to unroll a section of the tissue from the roll;

directing the of tissue unrolled from the rotating roll to a section separating means;

operating the section separating means to grasp the section of tissue from the unrolled tissue and tear the section of tissue from the roll, and dropping the separated tissue section from the roll onto the ground surface adjacent the boundary of the area being treated.

* * * * *